United States Patent
Per et al.

(10) Patent No.: US 11,023,329 B1
(45) Date of Patent: Jun. 1, 2021

(54) SYSTEMS AND METHODS FOR THE RECOVERY OF VIRTUAL MACHINES

(71) Applicant: Acronis International GmBh, Shaffhausen (CH)

(72) Inventors: Yuri Per, Dolgoprudny (RU); Dmitry Egorov, Fryazino (RU); Vasily Semyonov, Moscow (RU); Alain Marie Patrice Gentilhomme, Sammamish, WA (US); Serguei M. Beloussov, Costa del Sol (SG)

(73) Assignee: ACRONIS INTERNATIONAL GMBH

( * ) Notice: Subject to any disclaimer, the term of this patent is extended or adjusted under 35 U.S.C. 154(b) by 301 days.

(21) Appl. No.: 14/019,040

(22) Filed: Sep. 5, 2013

Related U.S. Application Data

(60) Provisional application No. 61/697,149, filed on Sep. 5, 2012.

(51) Int. Cl.
*G06F 11/14* (2006.01)

(52) U.S. Cl.
CPC .............................. *G06F 11/1464* (2013.01)

(58) Field of Classification Search
CPC ............ G06F 11/1448; G06F 11/1458; G06F 11/1469; G06F 9/45533; G06F 2009/45575; G06F 11/1464; G06F 9/45575; G06F 2212/151; G06F 2212/152; G06F 11/1446
See application file for complete search history.

(56) References Cited

U.S. PATENT DOCUMENTS

| | | | |
|---|---|---|---|
| 5,835,953 A * | 11/1998 | Ohran | G06F 11/1451 711/162 |
| 7,047,380 B2 | 5/2006 | Tormasov et al. | |
| 7,246,211 B1 | 7/2007 | Beloussov et al. | |
| 7,275,139 B1 | 9/2007 | Tormasov et al. | |
| 7,281,104 B1 | 10/2007 | Tsypliaev et al. | |
| 7,318,135 B1 | 1/2008 | Tormasov et al. | |
| 7,353,355 B1 | 4/2008 | Tormasov et al. | |
| 7,366,859 B2 | 4/2008 | Per et al. | |
| 7,475,282 B2 | 1/2009 | Tormasov et al. | |
| 7,603,533 B1 | 10/2009 | Tsypliaev et al. | |
| 7,636,824 B1 | 12/2009 | Tormasov | |
| 7,650,473 B1 | 1/2010 | Tormasov et al. | |
| 7,721,138 B1 | 5/2010 | Lyadvinsky et al. | |
| 7,779,221 B1 | 8/2010 | Tormasov et al. | |
| 7,801,867 B2 * | 9/2010 | Mittal | G06F 11/1469 707/686 |
| 7,831,789 B1 | 11/2010 | Tsypliaev et al. | |
| 7,886,120 B1 | 2/2011 | Tormasov | |
| 7,895,403 B1 | 2/2011 | Tormasov et al. | |

(Continued)

*Primary Examiner* — David Yi
*Assistant Examiner* — Tahilba O Puche
(74) *Attorney, Agent, or Firm* — K&L Gates LLP

(57) ABSTRACT

A method, computer program product, and computing system for recovery of virtual machines are described. A method may include creating, via a computing device, an image of at least a portion of a virtual machine disk. The method may further include comparing, via the computing device, the image of the portion of the virtual machine disk with the portion of the virtual machine disk that currently exists to determine changed sectors of the portion of the virtual machine disk. The method may additionally include restoring, via the computing device, the changed sectors of the portion of the virtual machine disk.

8 Claims, 4 Drawing Sheets

(56) References Cited

U.S. PATENT DOCUMENTS

| | | | |
|---|---|---|---|
| 7,934,064 B1 | 4/2011 | Per et al. | |
| 7,937,612 B1 | 5/2011 | Tormasov et al. | |
| 7,949,635 B1 | 5/2011 | Korshunov et al. | |
| 7,953,948 B1 | 5/2011 | Dyatlov et al. | |
| 7,979,690 B1 | 7/2011 | Dyatlov et al. | |
| 8,005,797 B1 | 8/2011 | Chepel et al. | |
| 8,051,044 B1 | 11/2011 | Dyatlov et al. | |
| 8,069,320 B1 | 11/2011 | Per et al. | |
| 8,073,815 B1 | 12/2011 | Korshunov et al. | |
| 8,074,035 B1 | 12/2011 | Per et al. | |
| 8,145,607 B1 | 3/2012 | Korshunov et al. | |
| 8,180,984 B1 | 5/2012 | Per et al. | |
| 8,225,133 B1 | 7/2012 | Tormasov et al. | |
| 8,261,035 B1 | 9/2012 | Tormasov et al. | |
| 8,296,264 B1 | 10/2012 | Dyatlov et al. | |
| 8,312,259 B1 | 11/2012 | Dyatlov et al. | |
| 8,347,137 B1 | 1/2013 | Chepel et al. | |
| 8,484,427 B1 | 7/2013 | Lyadvinsky et al. | |
| 8,645,748 B1 | 2/2014 | Chepel et al. | |
| 8,671,075 B1* | 3/2014 | Xing | G06F 11/1451 707/640 |
| 8,732,121 B1 | 5/2014 | Zorin et al. | |
| 8,856,927 B1 | 10/2014 | Beloussov et al. | |
| 8,996,830 B1 | 3/2015 | Lyadvinsky et al. | |
| 2006/0225065 A1 | 10/2006 | Chandhok et al. | |
| 2008/0120350 A1* | 5/2008 | Grabowski | G06F 16/10 |
| 2010/0011178 A1 | 1/2010 | Feathergill | |
| 2010/0058106 A1* | 3/2010 | Srinivasan | G06F 9/45533 714/2 |
| 2010/0088745 A1* | 4/2010 | Song | H04L 63/145 726/2 |
| 2010/0107158 A1* | 4/2010 | Chen | G06F 11/1484 718/1 |
| 2010/0228913 A1* | 9/2010 | Czezatke | G06F 3/0653 711/112 |
| 2011/0218966 A1* | 9/2011 | Barnes | G06F 11/1004 707/645 |
| 2011/0252001 A1* | 10/2011 | Bensinger | G06F 11/2097 707/658 |
| 2012/0011509 A1* | 1/2012 | Husain | G06F 9/5088 718/1 |
| 2012/0265959 A1* | 10/2012 | Le | G06F 9/45558 711/162 |

* cited by examiner

SYSTEMS AND METHODS FOR THE RECOVERY OF VIRTUAL MACHINES

RELATED APPLICATIONS

This application claims priority to U.S. Provisional Patent Application No. 61/697,149 filed on Sep. 5, 2012, the disclosure of which is herein incorporated by reference in its entirety.

TECHNICAL FIELD

The technical field may generally relate to cloud computing, and more particularly to recovery of virtual machines in a cloud environment.

BACKGROUND

Various transactions and web services may be accomplished using computing platforms based on virtual machines. As a result, in the event of a virtual machine ("VM") failure, the time to recover the VM may be a business-critical performance factor. Accordingly, reducing the time between the failure of a VM and its recovery may be a primary goal in various business contexts. The inventions described herein address this need and others.

SUMMARY

In an embodiment, a method for recovery of virtual machines may include creating, via a computing device, an image of at least a portion of a virtual machine disk. The method may further include comparing, via the computing device, the image of the portion of the virtual machine disk with the portion of the virtual machine disk that currently exists to determine changed sectors of the portion of the virtual machine disk. The method may also include restoring, via the computing device, the changed sectors of the portion of the virtual machine disk.

One or more of the following features may be included. The method may include shutting down, via the computing device, a virtual machine corresponding to the portion of the virtual machine disk to determine the changed sectors. The method may further include storing, via the computing device, the image of the portion of the virtual machine disk at a backup repository separate from the virtual machine disk. The method may also include opening, via the computing device, the virtual machine disk. The method may additionally include transferring, via the computing device, the changed sectors of the portion of the virtual machine disk from a backup repository to the virtual machine disk. Moreover, the method may include closing, via the computing device, the virtual machine disk. An agent running on the computing device may initiate, at least in part, the comparing operation and the restoring operation.

In an embodiment, a computer program product may reside on a computer readable storage medium and may have a plurality of instructions stored on it. When executed by a processor, the instructions may cause the processor to perform operations for recovery of virtual machines. The operations may include creating, via a computing device, an image of at least a portion of a virtual machine disk. The operations may further include comparing, via the computing device, the image of the portion of the virtual machine disk with the portion of the virtual machine disk that currently exists to determine changed sectors of the portion of the virtual machine disk. The operations may also include restoring, via the computing device, the changed sectors of the portion of the virtual machine disk.

One or more of the following features may be included. The operations may include shutting down, via the computing device, a virtual machine corresponding to the portion of the virtual machine disk to determine the changed sectors. The operations may further include storing, via the computing device, the image of the portion of the virtual machine disk at a backup repository separate from the virtual machine disk. The operations may also include opening, via the computing device, the virtual machine disk. The operations may additionally include transferring, via the computing device, the changed sectors of the portion of the virtual machine disk from a backup repository to the virtual machine disk. Moreover, the operations may include closing, via the computing device, the virtual machine disk. An agent running on the computing device may initiate, at least in part, the comparing operation and the restoring operation.

In an embodiment, a computing system for quick recovery of virtual machines may include one or more processors. The one or more processors may be configured to create, via a computing device, an image of at least a portion of a virtual machine disk. The one or more processors may be further configured compare, via the computing device, the image of the portion of the virtual machine disk with the portion of the virtual machine disk that currently exists to determine changed sectors of the portion of the virtual machine disk. The one or more processors may also be configured to restore, via the computing device, the changed sectors of the portion of the virtual machine disk.

One or more of the following features may be included. The one or more processors may be configured to shut down, via the computing device, a virtual machine corresponding to the portion of the virtual machine disk to determine the changed sectors. The one or more processors may further be configured to store, via the computing device, the image of the portion of the virtual machine disk at a backup repository separate from the virtual machine disk. The one or more processors may also be configured to open, via the computing device, the virtual machine disk. The one or more processors may additionally be configured to transfer, via the computing device, the changed sectors of the portion of the virtual machine disk from a backup repository to the virtual machine disk. Moreover, the one or more processors may be configured to close, via the computing device, the virtual machine disk. An agent running on the computing device may initiate, at least in part, the comparing operation and the restoring operation.

The systems and methods described herein relate to the recovery of data in a virtualized environment. In part, the systems and methods relate to decreasing the recovery time period for restoring a virtual machine. In one embodiment, the systems and methods are configured to avoid having to recover all the data, such as blocks of a VM, when restoring the VM such as from an image backup. In one embodiment, only certain VM data is recovered as part of the restoring of the VM.

In one embodiment, the restoration time period for a given VM can be reduced by using the systems and methods described herein. Specifically, the systems and methods described herein are configured to selectively transferring data that has been changed between the backup time and the time of failure. Thus, for a given VM, only certain data needs to be handled relative to all of the data associated with the VM. As a result, the restoration period is reduced relative to a restoration period for all of the VM data (changed data and unchanged data). The set of changed or modified data for a given VM is typically smaller in size when compared to the memory required for the VM. Faster VM recovery times result in reduced down time for the relevant virtualization platform.

In one embodiment, the invention relates to a method for recovery of virtual machines. The method may include initiating, via an agent running on a computing device, a backup and recovery routine for a virtual machine disk, wherein the agent includes an executable file configured to perform the backup and recovery routine; performing the backup and recovery routine by executing the executable file included in the agent, wherein performing the backup and recovery routine includes: creating, via the computing device, an image of at least a portion of a virtual machine disk and storing the image of the portion of the virtual machine disk at a backup repository separate from the virtual machine disk; comparing, via the computing device, the image of the portion of the virtual machine disk with the portion of the virtual machine disk that currently exists to determine changed sectors of the portion of the virtual machine disk; and obtaining write access to the virtual machine disk and transferring the changed sectors of the portion of the virtual machine disk from the backup repository to the virtual machine disk. In one embodiment, the method further includes transferring the changed sectors over a network. In one embodiment, the backup repository is a network accessible drive or memory storage.

The details of one or more implementations are set forth in the accompanying drawings and the description below. Other features and advantages will become apparent from the description, the drawings, and the claims.

DETAILED DESCRIPTION

A cloud provider may run backup and recovery routines to ensure persistence of a tenant's applications, data, or other resources accessed through one or more virtual machines ("VM"). Alternatively, VM can be used as part of a virtualization software environment on a single user's desktop or mobile device. VMs can be used for various purposes and include data of varying sizes including operating systems, applications, and databases of user data as a non-limiting example. As a result, it is important to be able to provide data backup and recovery relative to VMs.

One problem that may occur during recovery of a VM (on top of an existing VM, i.e. to original location) is that all of data with the VM may be overwritten. As a consequence, the time for recovery of the VM on top of the existing VM may be the same as recovery to a new VM from a backup image. Recovery methods may include transferring all the VM data from the backup location to the original VM location. Other recovery methods may attempt to reduce recovery time by using different backup technologies, such as replication, or mounting the backup as a VM. The replication may not be effective in terms of occupied storage (backups take less space than replicas).

In view of the forgoing, there may be a need for a system that enables quick and/or incremental recovery of virtual machines. In an implementation, the techniques and features described in the present disclosure are directed towards systems and methods for quick and/or incremental recovery of virtual machines.

Figure 1:
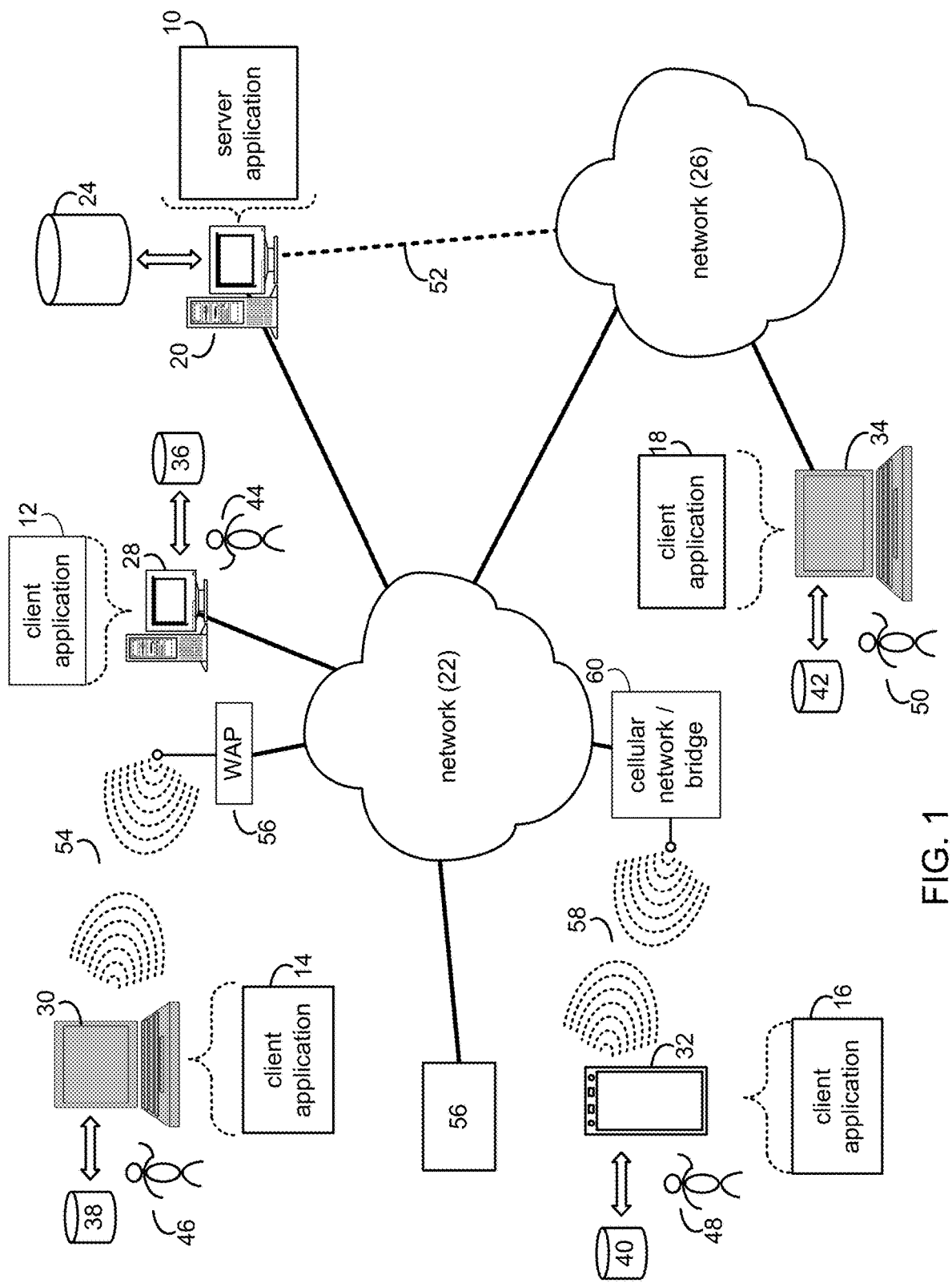
FIG. 1 depicts an example system that can execute implementations of an embodiment of the invention.
Figure 3:
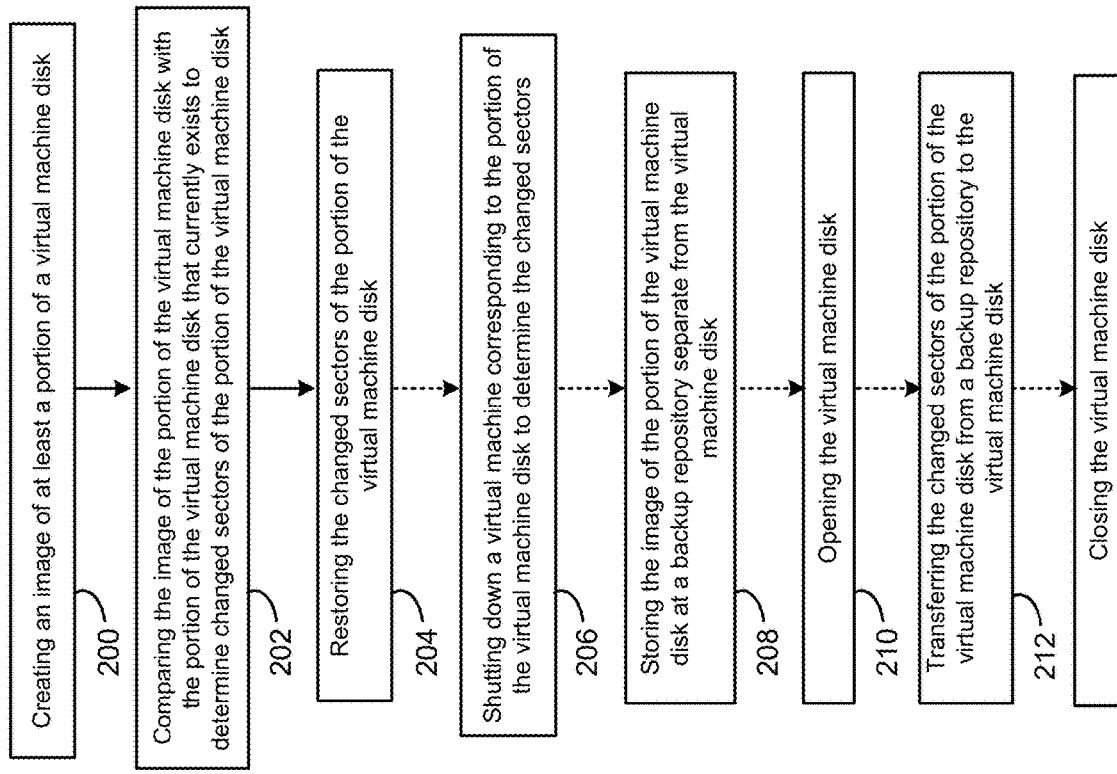
FIG. 3 is a flowchart illustrating an example process for recovery of virtual machines in accordance with an embodiment of the invention.

Referring to FIG. 1, there is shown a server application 10 and client applications 12, 14, 16, and 18 and various processing steps or stages associated with VM data backup and recovery as shown in FIG. 3. Server application 10 and/or one or more of client applications 12, 14, 16, and/or 18 may execute one or more processes configured to carry out one or more of the features described herein. Server application 10 may be referred to as a process configured to carry out one or more of the features described herein, such as recovery process 10. Further, one or more of client applications 12, 14, 16, and 18 may be referred to as a process configured to carry out one or more of the features described herein, such as recovery processes 12, 14, 16, and/or 18.

As will be discussed below with regard to FIG. 3, recovery process 10 may create 200 an image of at least a portion of a virtual machine disk. Recovery process 10 may also compare 202 the image of the portion of the virtual machine disk with the portion of the virtual machine disk that currently exists to determine changed sectors of the portion of the virtual machine disk. Recovery process 10 may further restore 204 the changed sectors of the portion of the virtual machine disk. In an implementation, recovery process 10 may shut down 206 a virtual machine corresponding to the portion of the virtual machine disk to determine the changed sectors. Recovery process 10 may also store 208 the image of the portion of the virtual machine disk at a backup repository separate from the virtual machine disk. Recovery process 10 may additionally open 210 the virtual machine disk. Further, recovery process 10 may transfer 212 the changed sectors of the portion of the virtual machine disk from a backup repository to the virtual machine disk. Moreover, recovery process 10 may close 214 the virtual machine disk.

The recovery process may be a server-side process (e.g., server-side recovery process 10), a client-side process (e.g., client-side recovery process 12, client-side recovery process 14, client-side recovery process 16, or client-side recovery process 18), or a hybrid server-side/client-side process (e.g., a combination of server-side recovery process 10 and one or more of client-side recovery processes 12, 14, 16, and/or 18).

System Overview

Referring to FIG. 1, Server-side recovery process 10 may reside on and may be executed by server computer 20, which may be in communication with network 22 (e.g., the Internet or a local area network). Examples of server computer 20 may include, but are not limited to: a personal computer, a server computer, a series of server computers, a mini computer, and/or a mainframe computer. The server computer 20 may be a distributed system and the operations of server computer 20 may execute on one or more processors, simultaneously and/or serially. For example, server computer 20 may be a symbolic representation of a cloud computing site, cloud environment, or cloud platform running multiple servers, computers, or virtual machines. Server computer 20 may execute one or more operating systems, examples of which may include but are not limited to: Microsoft Windows Server™; Novell Netware™; Redhat Linux™, Unix, or a custom operating system, for example.

The instruction sets and subroutines of server-side recovery process 10, which may be stored on storage device 24 coupled to server computer 20, may be executed by one or more processors (not shown) and one or more memory architectures (not shown) incorporated into server computer 20. Storage device 24 may include but is not limited to: a hard disk drive; a tape drive; an optical drive; a RAID array; a random access memory (RAM); and a read-only memory (ROM).

Server computer 20 may execute a web server application that allows for access to server computer 20 (via network 22) using one or more protocols, examples of which may include but are not limited to HTTP (i.e., HyperText Transfer Protocol). Network 22 may be in communication with one or more secondary networks (e.g., network 26), examples of which may include but are not limited to: a local area network; a wide area network; or an intranet, for example.

Client-side recovery processes 12, 14, 16, and 18 may reside on and may be executed by client electronic devices 28, 30, 32, and/or 34 (respectively), examples of which may include but are not limited to personal computer 28, a television with one or more processors embedded therein or coupled thereto (not shown), laptop computer 30, data-enabled mobile telephone 32, notebook computer 34, a tablet (not shown), and a personal digital assistant (not shown), for example. Client electronic devices 28, 30, 32, and/or 34 may each be in communication with network 22 and/or network 26 and may each execute an operating system, examples of which may include but are not limited to Apple iOS™, Microsoft Windows™, Android™, Redhat Linux™, or a custom operating system.

The instruction sets and subroutines of client-side recovery processes 12, 14, 16, and 18, which may be stored on storage devices 36, 38, 40, and 42 (respectively) coupled to client electronic devices 28, 30, 32, and 34 (respectively), may be executed by one or more processors (not shown) and one or more memory architectures (not shown) incorporated into client electronic devices 28, 30, 32, and 34 (respectively). Storage devices 36, 38, 40, and 42 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Client-side recovery processes 12, 14, 16, 18 and/or server-side recovery process 10 may be processes that run within (i.e., are part of) a cloud computing site, cloud computing application, cloud platform, or cloud environment. Alternatively, client-side recovery processes 12, 14, 16, 18 and/or server-side recovery process 10 may be stand-alone applications that work in conjunction with the cloud computing site, cloud computing application, cloud platform, or cloud environment. One or more of client-side recovery processes 12, 14, 16, 18 and server-side recovery process 10 may interface with each other (via network 22 and/or network 26).

Users 44, 46, 48, and 50 may access server-side recovery process 10 directly through the device on which the client-side recovery process (e.g., client-side recovery processes 12, 14, 16, and 18) is executed, namely client electronic devices 28, 30, 32, and 34, for example. Users 44, 46, 48, and 50 may access server-side recovery process 10 directly through network 22 and/or through secondary network 26. Further, server computer 20 (i.e., the computer that executes server-side recovery process 10) may be in communication with network 22 through secondary network 26, as illustrated with phantom link line 52.

The various client electronic devices may be directly or indirectly coupled to network 22 (or network 26). For example, personal computer 28 is shown directly coupled to network 22 via a hardwired network connection. Further, notebook computer 34 is shown directly coupled to network 26 via a hardwired network connection. Laptop computer 30 is shown wirelessly coupled to network 22 via wireless communication channel 54 established between laptop computer 30 and wireless access point (i.e., WAP) 56, which is shown directly coupled to network 22. WAP 56 may be, for example, an IEEE 802.11a, 802.11b, 802.11g, 802.11n, Wi-Fi, and/or Bluetooth device that is capable of establishing a wireless communication channel 54 between laptop computer 30 and WAP 56. Data-enabled mobile telephone 32 is shown wirelessly coupled to network 22 via wireless communication channel 58 established between data-enabled mobile telephone 32 and cellular network/bridge 60, which is shown directly coupled to network 22.

All of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. Bluetooth is a telecommunications industry specification that allows e.g., mobile phones, computers, and personal digital assistants to be interconnected using a short-range wireless connection.

Recovery Process

For the following discussion, server-side recovery process 10 will be described for illustrative purposes and server computer 20 may serve as a representation of a cloud computing site and referred to as cloud computing site 20 which includes multiple server computers. It should be noted that server-side recovery process 10 may interact with client-side recovery process 12 and may be executed within one or more applications that allow for communication with client-side recovery process 12. However, this is not intended to be a limitation of this disclosure, as other configurations are possible (e.g., stand-alone, client-side recovery processes and/or stand-alone server-side recovery processes). For example, some implementations may include one or more of client-side recovery processes 12, 14, 16, and 18 in place of or in addition to server-side recovery process 10.

The systems and methods (e.g., recovery process 10) described herein relate to the recovery of data in a virtualized environment. In part, the systems and methods relate to decreasing the recovery time period for restoring a virtual machine. In an embodiment, the systems and methods may be configured to avoid having to recover all the data, such as blocks of a VM, when restoring the VM, such as from an image backup. In an embodiment, only certain VM data may be recovered as part of the restoring of the VM. For example the techniques and features described herein may provide for the ability to compare an image of a virtual disk to a later existing state of the virtual disk, and to determine and restore only the changes to the virtual disk since the image was taken.

Further, in an embodiment, the restoration time period for a given VM may be reduced by using the systems and methods and one or more techniques or features described herein. Specifically, the systems and methods described herein may be configured to selectively transfer data that has been changed between the backup time and the time of failure. Thus, for a given VM, only certain data may need to be handled relative to all of the data associated with the VM. As a result, the restoration period may be reduced relative to a restoration period for all of the VM data (changed data and unchanged data). The set of changed or modified data for a given VM may typically be smaller in size when compared to the memory required for the VM. Faster VM recovery times may result in reduced down time for the relevant virtualization platform. As an example if the size of a backed up VM is about 10.64 gigabytes, a full recovery of the VM from backup located on network share drive can take about 13 minutes and 25 seconds. Recovery from the same backup to original location (into original VM) using an embodiment of the invention would only require about 21 seconds. In one embodiment, the ratio of performing a conventional recovery (about 0.01 to 0.03 gigabytes per second) to the recovery time for a virtual machine using an embodiment of the invention (about 0.4 to about 0.6 gigabytes per second) ranges from about 0.025 to about 0.05. The inverse of the forgoing ratio ranges from about 20 to about 40.

Recovery process 10 may include forming a backup file of a VM, which may include a disk/partition image of the virtual disks. Recovery process 10 may also include executing the recovery process using the backup file and performing recovery to the original VM location (the original VM may be present on the ESX(i) host). Executing the recovery process may include calculating the blocks of data that may need to be recovered by comparing the contents of the backup file and the current state of the VM virtual disks. Executing the recovery process may also include restoring the blocks of data that have been changed since the time of the backup creation.

The systems described herein may include one or more memory elements for backup of software and databases, virtual machines, and computer storage products including instructions to be executed by a processor to cause the processor to implement the methods described herein. The systems described herein may also include a backup repository, where the VM backup file may be located; the backup repository may be disposed in a memory, a portion of a memory, or across one or more memories.

Referring now to FIG. 1, one or more of users 44, 46, 48, and 50 may be cloud administrators at a cloud provider or may be cloud end-users. The cloud administrators may access and administer cloud computing site 20 and the cloud-end users may access and interact with cloud computing site 20 through one or more of client electronic devices 28, 30, 32, 34 (respectively). Cloud computing site 20 may run a cloud or virtualization application such as VMWare™ or may include bare-metal embedded hypervisors (e.g., VMware™ ESX™ and VMware™ ESXi™) that may run directly on server hardware at cloud computing site 20. Further, cloud computing site 20 may include a vCloud™ architecture that may enhance cooperation between hypervisors. Recovery process 10 may run at cloud computing site 20 and may include any number of the techniques or features described herein.

Figure 4:
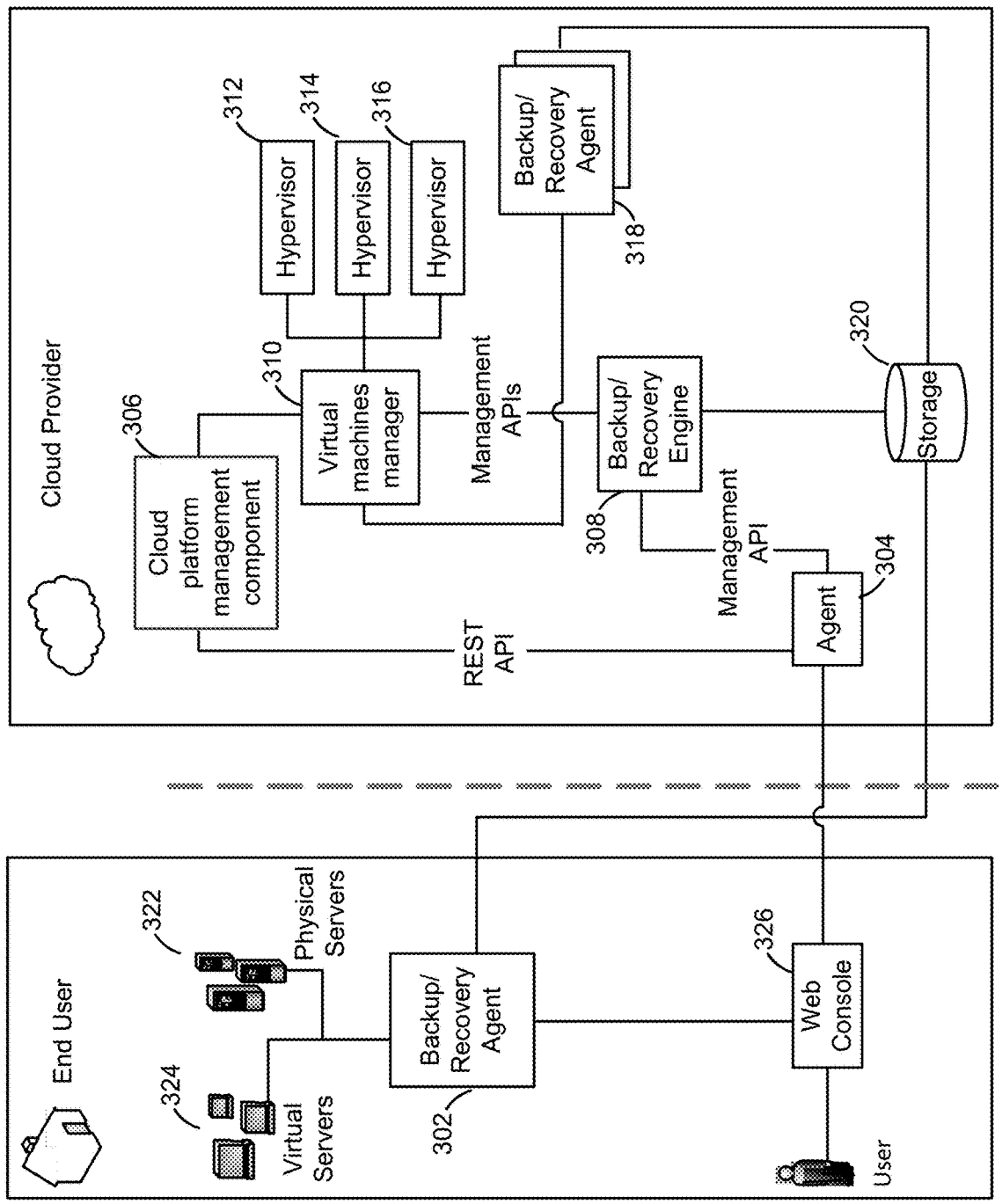
FIG. 4 depicts an example infrastructure in accordance with an embodiment of the invention.

Referring now to FIG. 4, in an implementation, cloud agent 304 (or agent 304), which may be a vCloud™ Agent component may be integrated with cloud platform 306, which may be VMware™ vCloud Director™, through a REST API, which may be VMware™ REST API.

A cloud agent may be a component which obtains information from the cloud platform and presents it to a user (cloud admin or tenant), gets a user's requests, and converts them into tasks scripts that are sent to a backup engine. In an implementation, cloud agent 304 may include executable code configured to perform backup and recovery operations.

The agent may include executable code to cause a processor to perform the methods (e.g., recovery process 10) described herein, for example, to perform (manage) the backup process and the recovery process. The agent may be, for example, a software and/or hardware module. The system can include a hypervisor (i.e., VMWare ESX(i) host), which may define the infrastructure where the agent operates. In one embodiment, the agent used to perform one or more processing or data analysis steps associated with VM data backup and recovery is referred to as a VM backup and recovery agent or a cloud agent or as an agent. The systems and methods described herein may include VMware Changed Block Tracking (CBT) technology to calculate which blocks have changed since the last backup.

Further, the systems described herein may include a cloud platform which may be a component that provides authentication and multitenancy along with self-service resource provisioning. A backup engine may be a component that interacts with a hypervisor management node, obtains the list of resources from it, and processes task scripts for back up or recovery of those resources (virtual machines). A hypervisor management node may be a component providing centralized management and monitoring for hypervisor hosts. A hypervisor may be a component hosting virtual machines.

Cloud agent 304 may also be in communication with backup engine 308 through a management API, which may be provided by backup engine 308. Backup engine 308 may be integrated with hypervisor management node 310, which may be a VMware™ vCenter™ server. Hypervisor management node 310, which may also be referred to as a virtual machines manager, may provide centralized management for hypervisors 310, 312, and 314, which may be VMware™ ESXi™ hosts hosting virtual machines. Backup engine 308 may provide backup and recovery capability for virtual machines hosted on hypervisors 310, 312, or 314.

Figure 2:
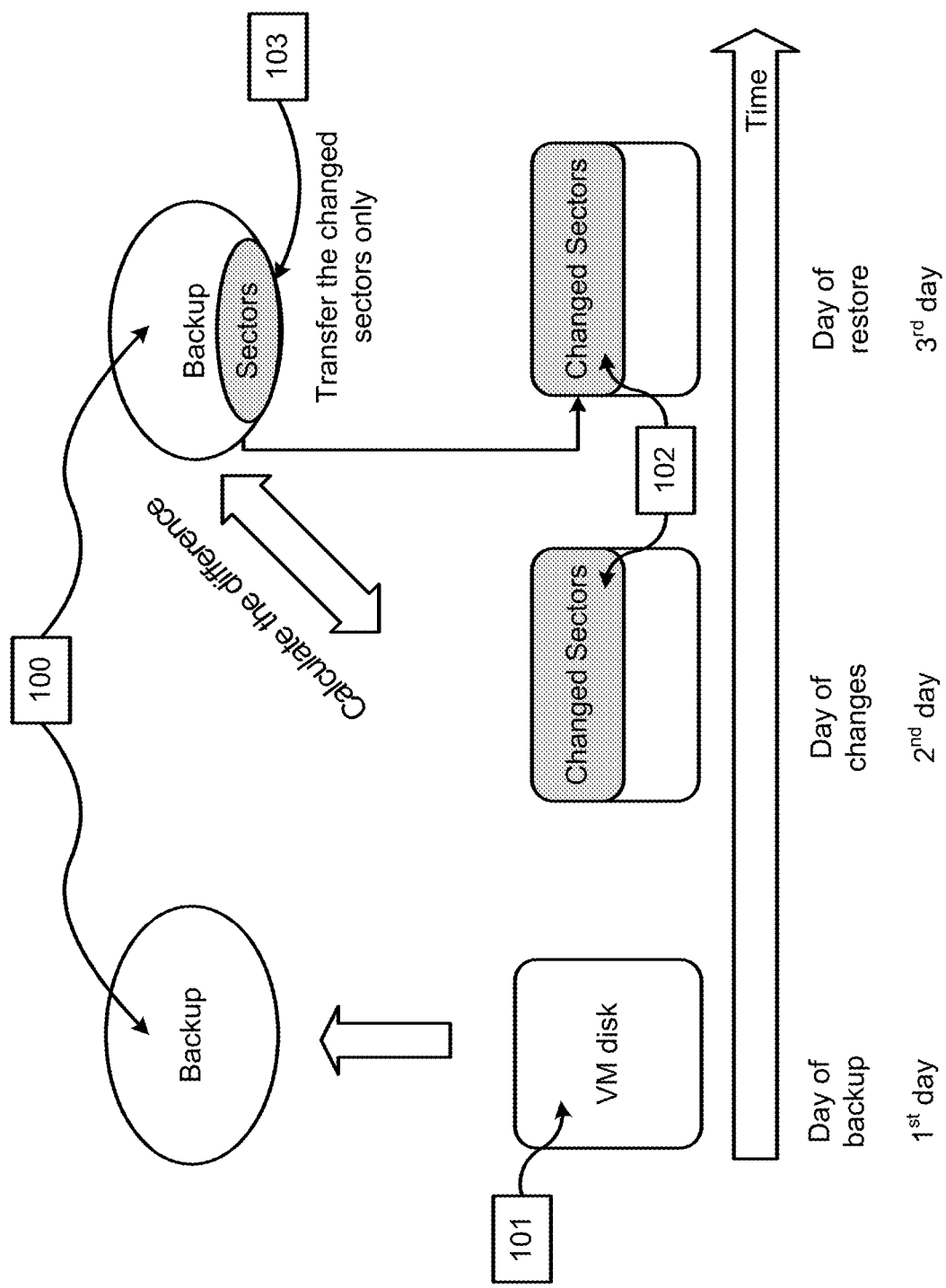
FIG. 2 is a diagrammatic flowchart illustrating an example process for recovery of virtual machines in accordance with an embodiment of the invention.

Referring now to FIG. 2, an example process in accordance with an embodiment of the invention is shown. In an embodiment, FIG. 2 may represent a principal scheme of an incremental restore workflow which may be implemented via recovery process 10 as described herein. VM disk 101, changed sectors 102, backup 100, backup sectors 103, and associated databases may be instantiated in a one or more memories or portions of memories (not shown). The backup recovery process and associated agent (e.g., agent 304) may be software and/or hardware modules, and may include a computer storage product including code configured to be executed by one or more processors (not shown) to execute the method (e.g., recovery process 10) described below. The system and method described by FIG. 2 may be configured to access data and databases associated with the VMs, and send signals indicative of data (i.e., changed sectors and associated differences) to and from memory locations, processors, etc.

Recovery process 10 may create 200 an image of at least a portion of a virtual machine disk. For example, as shown in FIG. 2, and referring also to FIG. 3, recovery process 10 may include creation of backup file 100 of a VM hosted on an ESX(i) host by means of an "agent" (e.g., agent 304) running on the same (or another) ESX(i) host or on a separate Windows machine. Creation of the backup file may include creation of disk/partition image 100 of the VM contents 101 using VMware VDDK API. Creation of the backup file may also include adding CBT specific information into the backup file (CBT ID). In an embodiment, recovery process 10 may store 208 the image of the portion of the virtual machine disk at a backup repository (e.g., storage 320) separate from the virtual machine disk.

Further, recovery process 10 may also include initiating the recovery process of the VM backed up, as discussed above, using an incremental restore mode which may include one or more of the techniques and features described below. Recovery process 10 may shut down 206 a virtual machine corresponding to the portion of the virtual machine disk to determine changed sectors. For example, initiating the recovery process may include shutting down the VM to which the backup is restored.

Recovery process 10 may additionally compare 202 the image of the portion of the virtual machine disk with the portion of the virtual machine disk that currently exists to determine changed sectors of the portion of the virtual machine disk. For example, recovery process 10 may include analyzing the existing virtual disks/partitions structure and comparing the contents 102 with the sectors 103 recorded in the backup file 100. Further, recovery process 10 may perform the analysis using a CBT method. The CBT method may include acquiring a list of changed sectors from a CBT API. For example, the CBT method (via, e.g., recovery process 10) may include acquiring a current CBT ID and comparing it with the CBT ID recorded in the backup file 100.

It should be noted that utilization of CBT and the CBT method are described herein in association with the techniques and features of an embodiment of the invention for illustrative purposes only, and other techniques and features for comparing the image of the portion of the VM disk with the portion of the VM disk that currently exists (or the current VM disk state) to determine changed sectors of the portion of the VM disk are within the scope of the invention. For example, the difference between the current state of the VM and the older state recorded inside the image of the VM may be determined by analyzing the checksums of groups of the sectors inside the current state of the VM (e.g., by reading the virtual disk) and comparing them with the sectors inside the backup image as the images may already contain checksums of the groups of sectors.

Additionally, regardless of how many backups are created or when the backups are created, the difference between the current state of the VM and the older state recorded inside the image of the VM may be determined between any backup in the chain, no matter how old it is, as long as the presence of the disk being recovered (i.e., the current state of the VM) and the presence of the backup image exist.

Recovery process 10 may restore 204 the changed sectors of the portion of the virtual machine disk. For example, after the difference 102 (i.e., difference in changed sectors) is defined, recovery process 10 may open 210 VM disk 101 for write access and may transfer only the sectors 103 that have been changed since the backup file 100 was created. In this way, recovery process 10 may transfer 212 the changed sectors of the portion of the virtual machine disk from a backup repository (e.g., storage 312) to the virtual machine disk. Further, recovery process 10 may close 214 the virtual machine disk. For example, recovery process 10 may finalize the recovery by closing the VM disk after the data is transferred to the VM disk.

In an implementation, the resources provisioned to the authenticated cloud computing client are provisioned through a cloud platform associated with the cloud computing site and are accessible only through the cloud platform.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the disclosure can be realized as one or more computer program products, i.e., one or more modules of computer program instructions encoded on a computer readable medium for execution by, or to control the operation of, a data processing apparatus. The computer readable medium can be a machine-readable storage device, a machine readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions or computer program products and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. These may also be referred to as computer readable storage media. The processor and the memory can be supplemented by, or incorporated in, special purpose logic circuitry.

To provide for interaction with a user, implementations of described herein can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations of the present disclosure can be realized in a computing system that includes a back end component, e.g., as a data server, or that includes a middleware component, e.g., an application server, or that includes a front end component, e.g., a client computer having a graphical user interface or a Web browser through which a user can interact with an implementation of the present disclosure, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations on the scope of the disclosure or of what may be claimed, but rather as descriptions of features specific to particular implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

A number of embodiments and implementations have been described. Nevertheless, it will be understood that various modifications may be made. Accordingly, other embodiments and implementations are within the scope of the following claims. For example, the actions recited in the claims can be performed in a different order and still achieve desirable results.

What is claimed is:

1. A computing system for recovery of virtual machines, the computing system comprising one or more processors, wherein the one or more processors are configured to:
   create, via a computing device, an image of a portion of a virtual machine disk as a backup file;
   store, via the computing device, the backup file at a backup repository separate from the virtual machine disk;
   shut down, via the computing device, a virtual machine corresponding to the portion of the virtual machine disk to determine the changed sectors during an incremental backup of the virtual machine;
   compare, via the computing device, the image of the portion of the virtual machine disk with the portion of the virtual machine disk to determine changed sectors of the portion of the virtual machine disk;
   restore to the virtual machine disk, via the computing device, the changed sectors of the portion of the virtual machine disk from the image in response to one or more task scripts sent to a backup engine from a cloud agent; and
   recover a virtual machine associated with the virtual machine disk using the foregoing steps such that incremental recovery of the virtual machine is 20 to 40 times faster than recovering all of the virtual machine data.

2. The computing system of claim 1, wherein the one or more processors are further configured to:
   open, via the computing device, the virtual machine disk;
   transfer, via the computing device, the changed sectors of the portion of the virtual machine disk from a backup repository to the virtual machine disk; and
   close, via the computing device, the virtual machine disk.

3. The computing system of claim 1, wherein an agent running on the computing device initiates, at least in part, the comparing operation and the restoring operation.

4. A method for recovery of virtual machines, the method comprising:
   shutting down, via the computing device, a virtual machine associated with a portion of a virtual machine disk during a virtual machine backup process;
   creating, via a computing device, an image of the portion of a virtual machine disk and storing the image of the portion of the virtual machine disk at a backup repository separate from the virtual machine disk;
   adding changed block tracking information to the backup file;

comparing, via an agent running on the computing device, the image of the portion of the virtual machine disk with the portion of the virtual machine disk to determine changed sectors of the portion of the virtual machine disk;

obtaining write access to the virtual machine disk;

acquiring a list of changed sectors from a changed block tracking application programming interface;

restoring the changed sectors of the portion of the virtual machine disk from the backup repository to the virtual machine disk in response to one or more task scripts sent to a backup engine from a cloud agent; and recovering a virtual machine associated with the virtual machine disk using the foregoing steps such that incremental recovery of the virtual machine is 20 to 40 times faster than recovering all of the virtual machine data.

5. The method of claim 4 further comprising transferring the changed sectors over a network.

6. The method of claim 4 wherein the backup repository is a network accessible drive or memory storage.

7. The method of claim 4, wherein the comparing further comprises:

acquiring a current changed block tracking identification; and comparing the current changed block tracking identification with a changed block tracking identification recorded with the image.

8. The method of claim 4, wherein the comparing further comprises:

analyzing checksums of one or more sectors of the portion of the virtual machine disk; and comparing the checksums of the one or more sectors of the portion of the virtual machine disk with checksums in the image.

* * * * *